J. CHILCOTT.
Mash Tun.

No. 47,931.                                      Patented May 30, 1865.

Witnesses:                                       Inventor:

UNITED STATES PATENT OFFICE.

JOHN CHILCOTT, OF BROOKLYN, NEW YORK.

IMPROVED MASH-TUN.

Specification forming part of Letters Patent No. 47,931, dated May 30, 1865; antedated May 16, 1865.

*To all whom it may concern:*

Be it known that I, JOHN CHILCOTT, of Brooklyn, in the county of Kings and State of New York, have invented a new and useful Improvement in Mash-Tuns; and I do hereby declare that the following is a full, clear, and exact description of the same, reference being had to the accompanying drawings, forming part of this specification, in which—

Figure 1:
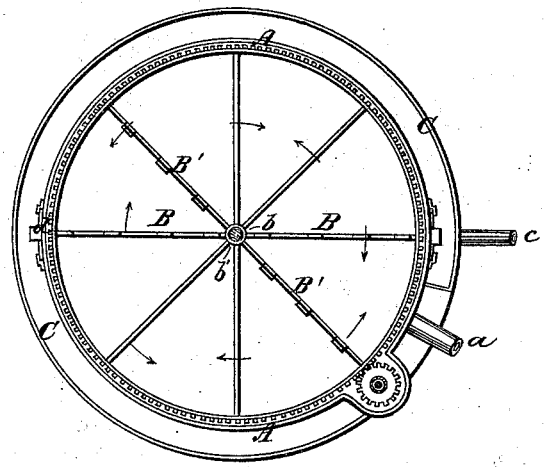
Figure 2:
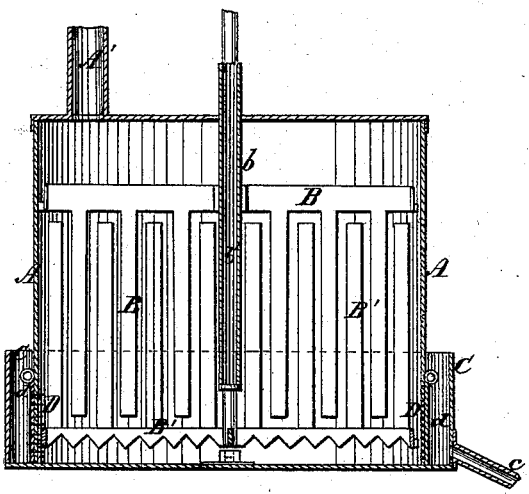

Figure 1 is a plan of my invention, the cover being removed. Fig. 2 is a vertical central section of the same.

Similar letters of reference indicate corresponding parts in the several figures.

The object of my invention is to separate the wort from the husks contained therein after its having been thoroughly stirred in the mash-tun and ready to be drawn off; and to this end it consists in providing the mash-tun with a surrounding trough, wherein the wort can be collected at several places through strainers which are fitted to openings in the mash-tun, allowing the fine starchy and floury particles of the grain to pass out and retaining all the husks or skins and other coarse substances.

To enable others skilled in the art to construct and use my invention, I will proceed to describe it with reference to the drawings.

A is the mash-tun, of common construction, provided with two sets of stirrers, B B′, which are rotated by gears in opposite directions, to thoroughly stir the wort or liquor contained in the mash-tun A.

A′ is a pipe or spout attached to the cover of the mash-tun, through which the water and the grain can be supplied. The stirrer B is mounted on the hollow shaft $b$, which rotates about the central shaft, $b'$, allowing the latter to carry the stirrer B′ in an opposite direction.

D D are strainers fitted to openings in the sides of the mash-tun, which are provided with sliding gates $d$, to keep the liquor or wort inside of the mash-tun during the stirring operation.

C is a circular basin or trough extending nearly all around the mash-tun, and having an outlet-pipe, $c$, near its bottom.

The strainers D D reach up to about half the height of the trough, and admit the wort into the same whenever the doors $d$ are raised. They must be of such fineness that the husks could not pass through, but allow the fine particles of grain a free passage.

$a$ is a pipe for drawing off the residuary matters from the mash-tun after the wort has been run out through the strainers into the trough C, and thence through the pipe $c$.

This improved mash-tun is more especially intended to be used for making wort from grain prepared by the process described in my application for Letters Patent allowed October 15, 1864, but not yet issued, consisting of first steaming the grain till it is softened and bursts its skin, and afterward crushing it between the surfaces of rollers, by which the grain is crushed into a pulpy state without grinding up the skins, and so rendered capable of being very thoroughly mixed with water. The mash-tun may, however, be used in making wort from grain ground in the usual manner.

The operation of the mash-tun is simply as follows: The gates or shutters D D are closed upon the strainers during the stirring or mashing operation, and when this operation has been completed the said gates are opened and the wort allowed to run into the surrounding trough or basin C, whence it is drawn off through the pipe $c$. When the wort has all been drawn off, the pipe $a$ is opened and the skins and residuary matters drawn off from the tun.

What I claim as my invention, and desire to secure by Letters Patent, is—

The collecting trough or basin C, strainers $d\ d$, and gates or shutters D D, in combination with each other and with the mash-tun, substantially as and for the purpose herein specified.

JOHN CHILCOTT.

Witnesses:
 HIPPOLYTE MALI,
 J. W. COOMBS.